UNITED STATES PATENT OFFICE.

PHILIPPE DE CLAMECY, OF BOSTON, MASSACHUSETTS, ASSIGNOR TO B. F. STURTEVANT COMPANY, OF BOSTON, MASSACHUSETTS, A CORPORATION OF MASSACHUSETTS.

COMPOSITION OF MATTER FOR AND METHOD OF SOLDERING AND WELDING ALUMINUM.

1,415,925.

Specification of Letters Patent. Patented May 16, 1922.

No Drawing. Application filed July 8, 1919. Serial No. 309,422.

*To all whom it may concern:*

Be it known that I, PHILIPPE DE CLAMECY, a citizen of the United States, residing at Boston, in the county of Suffolk and State of Massachusetts, have invented certain new and useful Improvements in Compositions of Matter for and Methods of Soldering and Welding Aluminum; and I do hereby declare the following to be a full, clear, and exact description of the invention, such as will enable others skilled in the art to which it appertains to make and use the same.

The present invention relates to a composition of matter for soldering or welding aluminum and to a method of soldering and welding aluminum.

Heretofore, difficulty has been experienced in soldering or welding aluminum due to the oxide which is always present on the surface of the aluminum. The removal of the oxide mechanically, as by scraping, is of no avail as it instantly reforms. This oxide interferes with the soldering and welding of aluminum either to itself or to other metals.

It has been attempted to remove the oxide chemically by means of fluxes of various composition preparatory to the soldering or welding operation. Such fluxes and methods, however, have not proved satisfactory.

The object of the present invention is to provide a composition of matter for soldering and welding aluminum, which may be easily and quickly applied to the surface to be soldered or welded, to form a joint or weld of great strength and permanency. A further object of the present invention is to devise a method of soldering and welding aluminum which shall be simple and easily practiced without requiring a high degree of skill on the part of the operator. To the above ends the present invention consists in the composition of matter and the method hereinafter described and more particularly defined in the claims.

The composition of matter comprises aluminum, tin, nitrate of silver and chloride of silver. These materials are all melted or fused together, thoroughly mixed and then cast in the form of a stick. The preferred proportions are aluminum 180 parts, tin 18 parts, nitrate of silver 1 part and chloride of silver 1 part.

With this composition adjacent surfaces of aluminum or of aluminum and other metals such as brass, copper, or iron may be soldered together or two pieces of aluminum may be welded together or cracks or blowholes in aluminum castings filled and closed.

In applying this composition of matter the surfaces are first cleaned and then heated with a torch or blowpipe and when well heated the stick of the composition is applied directly to the parts without the use of any soldering iron or other implement, the stick being rubbed back and forth over the heated surfaces. Thus by a single application of the composition and by a single heating the soldering or welding is accomplished.

Having thus described the present invention, what is claimed is:

1. A composition of matter for soldering or welding aluminum comprising aluminum, tin, nitrate of silver, and chloride of silver.

2. A composition of matter for soldering or welding aluminum comprising aluminum 180 parts, tin 18 parts, nitrate of silver 1 part, and chloride of silver 1 part.

PHILIPPE DE CLAMECY.